United States Patent

Ohmi et al.

[11] Patent Number: 5,983,933
[45] Date of Patent: Nov. 16, 1999

[54] SHUTOFF-OPENING DEVICE

[75] Inventors: Tadahiro Ohmi, Sendai; Yuji Kawano, Osaka; Keiji Hirao, Osaka; Hisashi Tanaka, Osaka; Naoya Masuda, Osaka; Yukio Minami, Osaka; Masayuki Hatano, Osaka; Shigeaki Tanaka, Osaka; Michio Yamaji, Osaka; Hiroshi Morokoshi, Osaka; Michio Kuramochi, Osaka; Nobukazu Ikeda, Osaka; Shigeru Itoi, Osaka; Michihiro Kashiwa, Osaka, all of Japan

[73] Assignees: Tadahiro Ohmi, Sendai; Fujikin Inc., Osaka, both of Japan

[21] Appl. No.: 08/974,550

[22] Filed: Nov. 19, 1997

[30] Foreign Application Priority Data

Nov. 20, 1996 [JP] Japan .................................. 8-308869

[51] Int. Cl.⁶ ..................................................... F16K 3/00
[52] U.S. Cl. ........................... 137/597; 137/606; 137/613
[58] Field of Search .................................... 137/597, 606, 137/884, 613

[56] References Cited

U.S. PATENT DOCUMENTS 3,797,524  3/1974  Sanelli ..................................... 137/606
4,558,845  12/1985  Hunkapiller ............................. 137/606
4,773,446  9/1988  Farnsworth et al. ..................... 137/606
5,320,139  6/1994  Paul et al. ............................ 137/606 X

FOREIGN PATENT DOCUMENTS 0 619 450 A1  4/1994  European Pat. Off. .
6-241400  6/1994  Japan .

Primary Examiner—Stephen M. Hepperle
Attorney, Agent, or Firm—Armstrong, Westerman, Hattori, McLeland & Naughton

[57] ABSTRACT

A valve mount having two valves removably installed thereon from above as arranged in a direction comprises an inflow channel forming member having a channel in communication with an inlet of the valve disposed at one end thereof, a communication channel forming member having a channel for causing an outlet of the valve at the end to communicate with an inlet of the other valve adjacent thereto, an outflow channel forming member having a channel in communication with an outlet of the other valve, and a subchannel forming member having a channel in communication with an inlet-outlet port formed in the other valve.

4 Claims, 4 Drawing Sheets

SHUTOFF-OPENING DEVICE

BACKGROUND OF THE INVENTION

The present invention relates to shutoff-opening devices, for example, for use in fluid control apparatus included in semiconductor manufacturing equipment, and more particularly to shutoff-opening devices comprising a plurality of valves, to be provided respectively at the inlet side and at the outlet side of a fluid controller such as a massflow controller and adapted to close or open a plurality of fluid channels.

With fluid control apparatus of semiconductor manufacturing equipment, a plurality of valves are usually arranged at the inlet side and outlet side of a massflow controller. In such arrangements, it is practice to use a shutoff-opening device in the form of a single unit and comprising a plurality of valves removably installed on a blocklike valve mount member from above as arranged in a row without interconnecting the valves with pipes (see JP-A-241400/1994). The inlet and outlet of each of the valves are formed in the bottom of the valve, and the mount member is formed with an inflow channel and outflow channel which are positioned in corresponding relation with the inlet and outlet. The valves are removably installed an the mount member from above so as to be individually inspectable or replaceable after the shutoff-opening device is mounted on a panel.

One fluid control apparatus comprises a multiplicity of shutoff-opening devices. These devices can be variously different in specifications; some devices comprise two or four valves, some valves may be different in the positions of the inlet and outlet in accordance with the interval between the valves, or an inlet-outlet port serving for an inlet or outlet for other fluid may be additionally provided between the inlet and outlet of at least one valve. The conventional shutoff-opening devices have the problem of being not amenable to modifications of specifications since there arises a need to prepare a new valve mount member even if the device differs from other devices in the position of only one outlet.

Further with shutoff-opening devices of the type described, it is important to seal off the joints of the components of the device, that is, to assure the joints of fluid-tightness.

SUMMARY OF THE INVENTION

An object of the present invention is to provide a shutoff-opening device which is highly amenable to changes or modifications of the specifications, such as an increase or decrease in the number of valves or alteration of the valve installation position, and in which the joints of the components of the device are nevertheless assured of fluid-tightness.

The present invention provides a shutoff-opening device which comprises a plurality of valves each having an inlet and an outlet in a lower surface thereof, and a valve mount having the valves removably installed thereon from above as arranged in a direction, the device being characterized in that the valve mount comprises an inflow channel forming member having a channel in communication with the inlet of the valve disposed at one end thereof, at least one communication channel forming member having a channel for causing the inlet of one of the valves to communicate with the outlet of the valve adjacent thereto, and an outflow channel forming member having a channel in communication with the outlet of the valve disposed at the other end of the mount.

The terms upper and lower as used herein refer respectively to the upper and lower sides of FIG. 1. However, these terms are used for convenience sake; the shutoff-opening device may be installed as positioned in FIG. 1 on a horizontal surface, or may alternatively be installed as turned upside down on a horizontal surface or installed on a vertical surface.

When the number of component valves of the device of the invention is to be increased or decreased, an additional communication channel forming member may be added or such a member may be removed in accordance with the desired number of valves. The valve-to-valve interval is variable, for example, by modifying the communication channel forming member only, without modifying the inflow channel forming member and the outflow channel forming members. The device is therefore easy to alter in specifications.

Further because the channel forming members are not in direct communication with one another through their channels, these members can be joined without using any interposed seal portion. This assures the present device of fluid-tightness although the valve mount comprises a plurality of members.

At least one of the valves may have an inlet-outlet port positioned between the inlet and the outlet of the valve and serving as an inlet or outlet for other fluid, the valve mount further comprising at least one subchannel forming member having a channel communicating with the inlet-outlet portion. Even in the case where the plurality of valves include a two-port valve having one inlet and one port, and a three-port valve additionally having an inlet-outlet port, the device is then easy to modify in specifications and can nevertheless be assured of fluid-tightness.

Preferably, the main body of the valve having the inlet-outlet port is formed with an inflow channel extending from the inlet thereof to a valve chamber, a subchannel extending from the inlet-outlet port to the valve chamber, and an outflow channel extending from the outlet thereof to the valve chamber, the subchannel being closable and openable by a valve element, the inflow channel being always in communication with the outflow channel.

With respect to a channel for introducing a fluid thereinto at one end of the valve mount and causing the fluid to flow therethrough via the main bodies of the valves and to flow out at the other end, this channel then has no portion that will retain fluids, with the result that when a particular fluid is passed through this channel, this fluid only is allowed to flow in a short period of time. For example, a process gas is introduced into the subchannel which is opened by the valve element, and the subchannel is thereafter closed by the valve element. The process gas will then remain in the outflow channel. When a purge gas is thereafter introduced into the device at one end of the valve mount, the purge gas forces out with its own pressure the remaining process gas from the outflow channel at the other end of the valve mount, whereby the interior of the device is rapidly replaced by the safe purge gas.

The inflow channel forming member, the communication channel forming member, the outflow channel forming member and the subchannel forming member may each be formed in a lower surface thereof with at least one positioning projection or positioning cavity, with the valve mount fixed to a support member which is formed with a positioning cavity or a positioning projection corresponding to the positioning projection or the positioning cavity, the valve mount can then be positioned in place reliably relative to the support member. Consequently, the valves can be attached one after another to the valve mount without the misregister of the bolt holes of the valves with the corresponding screw bores of the valve mount or the misregister of the channels of the valves with the corresponding channels of the mount. This facilitates the installation of the valves, further assuring the abutting channel portions of fluid-tightness with ease.

DESCRIPTION OF THE PREFERRED EMBODIMENT

An embodiment of the invention will be described below with reference to the drawings.

The terms upper, lower, left and right as used in the following description refer respectively to the upper side, lower side, left-hand side and right-hand side of FIG. 1.

Figure 1:
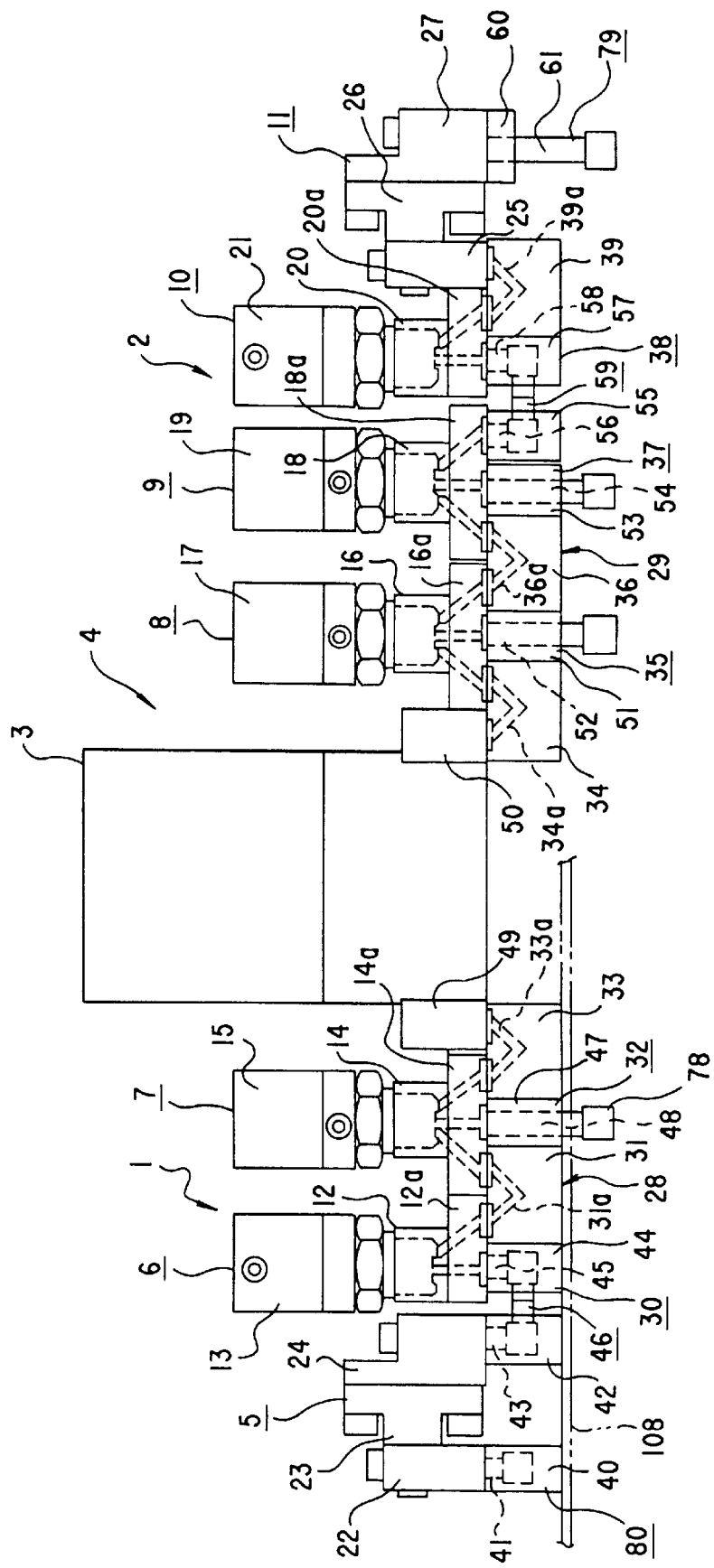
FIG. 1 is a front view showing a fluid control apparatus wherein shutoff-opening devices of the invention are used.
Figure 2:
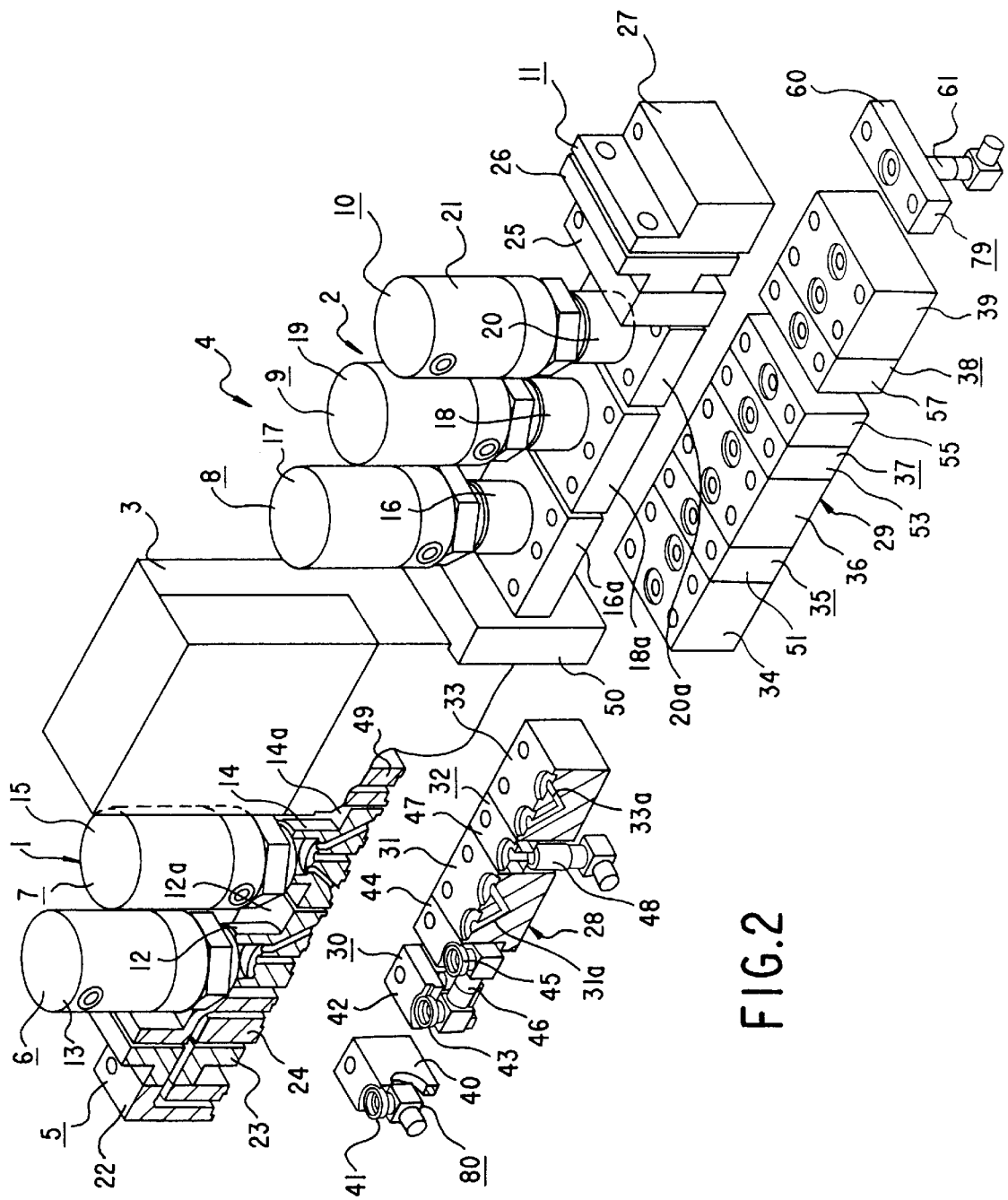
FIG. 2 is an exploded perspective view partly in section and showing the same.
Figure 3:
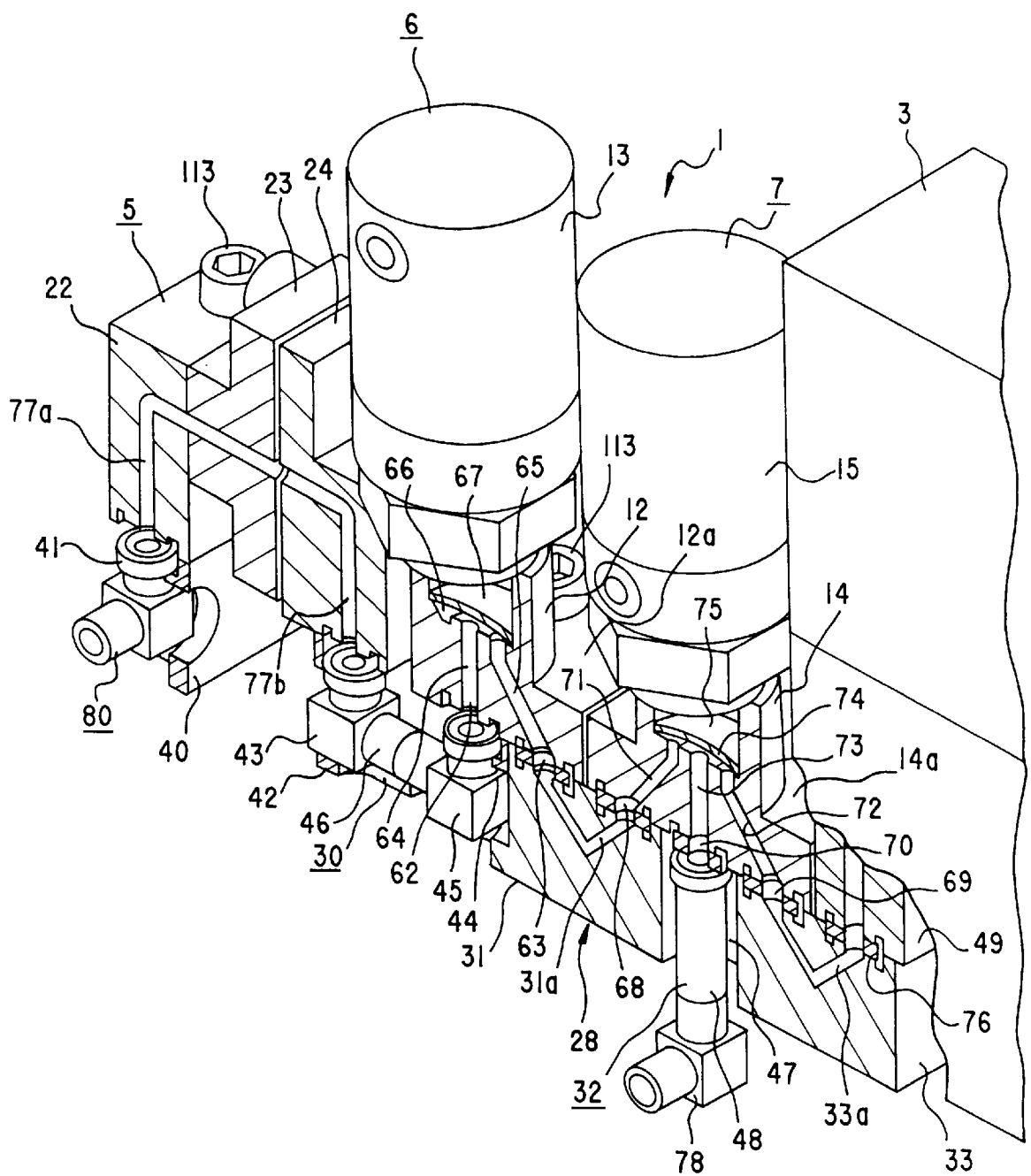
FIG. 3 is an enlarged perspective view partly in section and showing one of the shutoff-opening devices.

FIGS. 1 to 3 show shutoff-opening devices 1, 2 embodying the invention. These devices 1, 2 are arranged respectively at the left and at the right of a massflow controller 3 as illustrated to provide a fluid control apparatus 4, for example, for use in semiconductor manufacturing equipment.

The left shutoff-opening device 1 comprises a first on-off valve 6 disposed at the left, a second on-off valve 7 at the right and a first valve mount 28 having these valves 6, 7 installed thereon. The mount 28 comprises a plurality of couplings 31, 32, 33 as will be described later and is assembled by fixing the couplings 31 to 33 to a base plate (support member) 108. A first check valve 5 is disposed at the left of the left shutoff-opening device 1.

The right shutoff-opening device 2 comprises a third on-off valve 8 disposed at the left, an intermediate fourth on-off valve 9, a fifth on-off valve 10 at the right and a second valve mount 29 having these valves 8 to 10 installed thereon. The mount 29 comprises a plurality of couplings 34, 35, 36, 37, 38, 39 as will be described later and is assembled by fixing these couplings 34 to 39 to a base plate 108. A second check valve 11 is disposed at the right of the right device 2.

The on-off valves 6, 7, 8, 9, 10 each comprise a valve main body 12 (14, 16, 18, 20) and an actuator 13 (15, 17, 19, 21) mounted on the valve main body from above for suitably closing or opening channels therein. The valve main body 12 (14, 16, 18, 20) of each on-off valve 6 (7, 8, 9, 10) is formed at its lower end with a flange 12a (14a, 16a, 18a, 20a) which is rectangular when seen from above. The flanges 12a, 14a, and 16a, 18a, 20a are fastened to the valve mounts 28 and 29 with screws driven in from above.

The check valves 5, 11 each comprise a left valve main body 22 (25) having an inlet in its lower surface, a central valve main body 23 (26) similarly having an inlet and connected to the left valve main body 22 (25) with screws, and a right valve main body 24 (27) having an outlet in its lower surface and connected to the central valve main body 23 (26) with screws.

A left extension 49 in the form of a rectangular parallelepiped and having an inlet formed in its lower surface is provided at the left side of lower end portion of the massflow controller 3, and a right extension 50 in the form of a rectangular parallelepiped and formed in its lower surface with an outlet is provided at the right side thereof.

As shown in FIG. 3 on an enlarged scale, the first check valve 5 has an inflow channel 77a and an outflow channel 77b each of which is opened downward. The first on-off valve 6 is a two-port valve. The valve main body 12 has an inlet 62 positioned approximately at the center of its bottom surface and an outlet 63 positioned rightward in the bottom surface, and is internally formed with an inflow channel 64 extending from the inlet 62 to a valve chamber 66, and an outflow channel 65 extending from the outlet 63 to the valve chamber 66. The actuator 13 for the first on-off valve 6 is adapted to actuate a diaphragm valve element 67. When operated, the actuator 13 causes the valve element 67 to open or close the inflow channel 64.

The second on-off valve 7 is a three-port valve. The valve main body 14 is formed in its bottom surface with an inlet 68 at the left, an outlet 69 at the right and an inlet-outlet port 70 positioned approximately at the center and serving as an inlet or outlet for other fluid. The body 14 is internally formed with an inflow channel 71 extending from the inlet 68 to a valve chamber 74, a subchannel 73 extending from the port 70 to the valve chamber 74, and an outflow channel 72 extending from the outlet 69 to the chamber 74. The actuator 15 for the second on-off valve 7 is adapted to actuate a diaphragm valve element 75. When operated, the actuator 15 causes the valve element 75 to open or close the subchannel 73. On the other hand, the inflow channel 71 leading to the inlet 68 is always held in communication with the outflow channel 72 extending to the outlet 69 by the chamber 74.

The fifth on-off valve 10 has the same construction as the first on-off valve 6, and the third on-off valve 8 and the fourth on-off valve 9 have the same construction as the second on-off valve 7.

The lower surfaces of the valve main bodies 22, 23, 24, 12, 14 at the left of the massflow controller 3 are all flush with the lower surface of the left extension 49 of the controller 3. The lower surfaces of the right extension 50 of the massflow controller 3 and the valve main bodies 16, 18, 20, 25, 26, 27 at the right of the controller 3 are also all flush.

The inlet of the left valve main body 22 of the first check valve 5 is provided with a purge gas introduction coupling 80 which comprises a block 40 in the form of a rectangular parallelepiped and an L-shaped channel forming member 41 and supported by the block 40, and which is connected to a purge gas introduction line.

The outlet of the right valve main body 24 of the first check valve 5 is connected to the inlet of the valve main body 12 of the first on-off valve 6 by a first inflow channel forming coupling 30 for introducing a fluid into the left shutoff-opening device 1. The coupling 30 comprises two blocks 42, 44 each in the form of a rectangular parallelepiped, and a U-shaped communication channel forming member 46 supported by these blocks. The member 46 comprises two L-shaped channel forming members 43, 45 which are joined to each other.

The lower surface of right portion of the valve main body 12 and the lower surface of left portion of the valve main body 14 are opposed to the coupling 31 which is in the form of a rectangular parallelepipedal communication channel forming block. The coupling has a V-shaped channel 31a for causing the outlet of the first on-off valve 6 to communicate with the inlet of the second on-off valve 7.

The inlet-outlet port 70 of main body 14 of the second on-off valve 7 is provided with the coupling 32, i.e., first subchannel forming coupling, which comprises a rectangular parallelepipedal block 47 and an I-shaped subchannel forming member 48 supported by the block. A known L-shaped coupling 78 connected to a process gas introduction line is joined to the lower end of the coupling 32.

The lower surface of right portion of the second on-off valve main body 14 and the lower surface of left extension 49 of the massflow controller 3 are opposed to the coupling 33, i.e., rectangular parallelepipedal first outflow channel forming block coupling, which has a V-shaped channel 33a for discharging a fluid from the outlet of the valve 7 and sending the fluid to the controller 3 therethrough.

Thus, the first valve mount 28 for the left shutoff-opening device 1 comprises the couplings 30, 31, 32, 33 at the left of the massflow controller 3. Accordingly, the left on-off valve 1 has a purge gas channel through which a purge gas introduced through the check valve 5 is discharged by way of the coupling 30, main body 12 of the first on-off valve 6, coupling 31, main body 14 of the second on-off valve 7 and coupling 33, and a process gas channel through which a process gas introduced via the lower surface of the coupling 32 is discharged by way of the coupling 32, main body 14 of the second on-off valve 7 and coupling 33.

The lower surface of right extension 50 of the massflow controller 3 and the lower surface of left portion of the third on-off valve main body 16 are opposed to the coupling 34, i.e., a rectangular parallelepipedal second inflow channel forming block coupling, having a V-shaped channel 34a through which a fluid discharged from the controller 3 is introduced into the right shutoff-opening device 2.

The inlet-outlet port of the main body 16 of the third on-off valve 8 is provided with the coupling 35, i.e., second subchannel forming coupling, which comprises a rectangular block 51 and an L-shaped channel forming member 52 supported by the block and which is connected to an evacuating line.

The lower surface of right portion of the third on-off valve main body 16 and the lower surface of left portion of the fourth on-off valve main body 18 are opposed to the coupling 36, i.e., rectangular parallelepipedal second communication channel forming block coupling, which has a V-shaped channel 36a for causing the outlet of the third on-off valve 8 to communicate with the inlet of the fourth on-off valve 9.

The inlet-outlet port of the fourth on-off valve main body 16 is provided with the coupling 37, i.e., third subchannel forming coupling, which comprises a rectangular block 53 and an L-shaped channel forming member 54 supported by this block and which is connected to a process gas feed line.

The outlet of the fourth on-off valve main body 18 is caused to communicate with the inlet of main body 20 of the fifth on-off valve 10 by the coupling 38, i.e., third communication channel forming coupling, which comprises two rectangular parallelepipedal blocks 55, 57 and a communication channel forming member 59 supported by these blocks. The member 59 comprises two L-shaped channel forming members 56, 58 which are joined to each other.

The lower surface of right portion of the fifth on-off valve main body 20 and the lower surface of left main body 25 of the second check valve 11 are opposed to the coupling 39, i.e., rectangular parallelepipedal second outflow channel forming block coupling 39, which has a V-shaped channel 39a for causing the outlet of the valve 10 to communicate with the inlet of the second check valve 11.

Thus, the valve mount 29 for the right shutoff-opening valve 2 comprises the couplings 34, 35, 36, 37, 38, 39. Accordingly, the device 2 has a purge gas channel through which the purge gas introduced via the controller 3 is discharged by way of the couplings 34, 36, 38, 39, a process gas channel through which the process gas introduced via the controller 3 is fed to a process chamber by way of the couplings 34, 36, 37, and an evacuating channel for drawing off the gas from these channels through the coupling 35.

The outlet of right main body 27 of the second check valve 11 is provided with a purge gas discharge coupling 79 which comprises a rectangular block 60 and an L-shaped channel forming member 61 supported by the block and which is connected to a purge gas discharge line.

With the fluid control apparatus 4, a process gas is introduced into the first subchannel forming coupling 32 of the left shutoff-opening device 1, with the first on-off valve 6 closed, the second on-off valve 7 opened, the third on-off valve 8 closed, the fourth on-off valve 9 opened and the fifth on-off valve 10 closed, whereupon the process gas flows through the main body 14 of the second on-off valve 7 and the first outflow channel forming block coupling 33 into the massflow controller 3, has its flow rate controlled by the controller and is introduced into the right shutoff-opening device 2. The gas then flows through the second inflow channel forming block coupling 34, the main body 16 of the third on-off valve 8, the second communication channel forming block coupling 36, the main body 18 of the fourth on-off valve 9 and the third subchannel forming coupling 37 into the process chamber. A purge gas is thereafter introduced through the first check valve 5, with the first on-off valve 6 opened, the second on-off valve 7 closed, the third on-off valve 8 closed, the fourth on-off valve 9 closed and the fifth on-off valve 10 opened, whereupon the purge gas flows into the controller 3 via the first inflow channel forming coupling 30, the main body 12 of the first on-off valve 6, the first communication channel forming block coupling 31, the main body 14 of the second on-off valve 7 and the first outflow channel forming block coupling 33. The gas further flows through the second inflow channel forming block coupling 34, the main body 16 of the third on-off valve 8, the second communication channel forming block coupling 36, the main body 18 of the fourth on-off valve 9, the third communication channel forming coupling 38, the main body 20 of the fifth on-off valve 10, the second outflow channel forming block coupling 39 and the second check valve 11 and is discharged from the apparatus. At this time, the purge gas forces out with its own pressure the process gas remaining in the second valve main body 14 and the couplings 33, 34, 36, whereby the purge gas along is allowed to flow in a short period of time. With the fluid control apparatus, the purge gas line and the process gas line may be replaced by each other. The flow of process gas will then be replaced by the purge gas more rapidly.

With the opposite shutoff-opening devices 1, 2 described, the couplings 30, 38 are common in construction, the couplings 31, 33, 34, 36, 39 are common in construction, and the couplings 32, 35, 37 are also common in construction. Accordingly, the device 2 at the right is obtained by adding a three-port on-off valve to the device 1 at the left and adding the same couplings as the couplings 31, 32 to the valve mount 28 thereof. If the on-off valve to be added is a two-port on-off valve in this case, the fourth on-off valve 9 of the right device 2 is replaced by a 2-port valve, with the coupling 37 removed from the mount 29 thereof. Further if the distance between valves then becomes greater, only the pipe 59 forming the coupling 38 needs to be altered in length. Thus, the devices 1, 2 are amenable to modifications in specifications.

Moreover, the channel forming couplings 30 to 39 are not in direct communication with one another through their channels, so that these couplings can be joined without interposed seal portions, and the first and second mounts 28, 29 can be sealed off although comprising a plurality of components.

The couplings 30, 38 may each be in the form of a rectangular parallelepipedal block coupling having a V-shaped channel. Conversely, the coupling 31 and the like may each comprise two blocks and a U-shaped communication channel forming member supported by the blocks. The couplings 33, 34, 36 are formed by rectangular parallelepipedal members having respective V-shaped channels 33a, 34a, 36a, so that the apparatus 4 has the advantage that these members 33, 34, 36 can be heated as held between heaters to heat the process gas readily.

The left shutoff-opening device 1 has the two on-off valves 6, 7, and the right device 2 has the three on-off valves 8, 9, 10, whereas the number of component on-off valves is suitably variable. Two shutoff-opening devices each comprising a suitable number of on-off valves are arranged respectively at the left and right sides of a massflow controller, and such arrangements are further arranged in parallel to provide a fluid control apparatus for use in semiconductor manufacturing equipment.

The left shutoff-opening device 1 are assembled by the procedure to be described below with reference to FIGS. 4 and 5.

Figure 4:
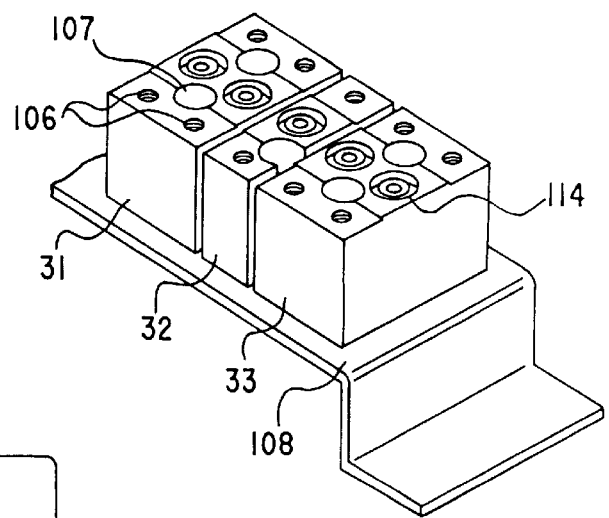
FIG. 4 is an enlarged perspective view of couplings included in the shutoff-opening device; end

FIG. 4 shows a portion of the left device 1 which portion comprises the first communication channel forming block coupling 31, the first outflow channel forming block coupling 33, and the subchannel forming coupling 32 between the two block couplings 31, 33. Each of the block couplings 31, 33 has an upper surface formed with exposed left and right openings 114 at the opposite ends of the V-shaped channel 31a or 33a as illustrated. At each of the front and rear sides of the left and right openings 114, the coupling has a pair of screw bore 106 for mounting the valve 7 or other member. Each of the block couplings 31, 33 is further formed with bolt holes 107 for inserting therethrough bolts 110 for fastening the coupling to a base plate 108. The bolt holes 107 are formed respectively at a position surrounded by the openings 114 and the front screw bores 106, and at a position surrounded by the openings 114 and the rear screw bores 106. The subchannel forming coupling 32 has an upper surface formed with an exposed subchannel opening 114. Formed in the coupling 32 at the front and rear sides of this opening 114 are a pair of screw bores 106 for attaching the valve 7 to the coupling. The coupling 32 is further formed with a single bolt hole 107 for inserting therethrough a bolt 110 for fastening the coupling 32 to the base plate 108. The bolt hole 107 is positioned between the opening 114 and the front screw hole 106. The front screw holes 106 of the couplings 31 to 33, the front bolt holes 107 thereof, the channel openings 114 thereof, the rear bolt holes 107 of the couplings 31, 33, or the rear screw holes 106 of the three couplings are aligned in the left-right direction. In each pair of these adjacent couplings, the screw holes 106 are arranged at the respective corners of a rectangle. A small clearance is formed between each pair of adjacent couplings so that the couplings 31 to 33 are movable leftward or rightward during installation.

Positioning cavities 115 are formed in the bottom surfaces of couplings 31, 32, 33 near the bolt holes 107. The base plate 108 is formed with positioning projections 116 corresponding to the respective cavities 115.

Figure 5:
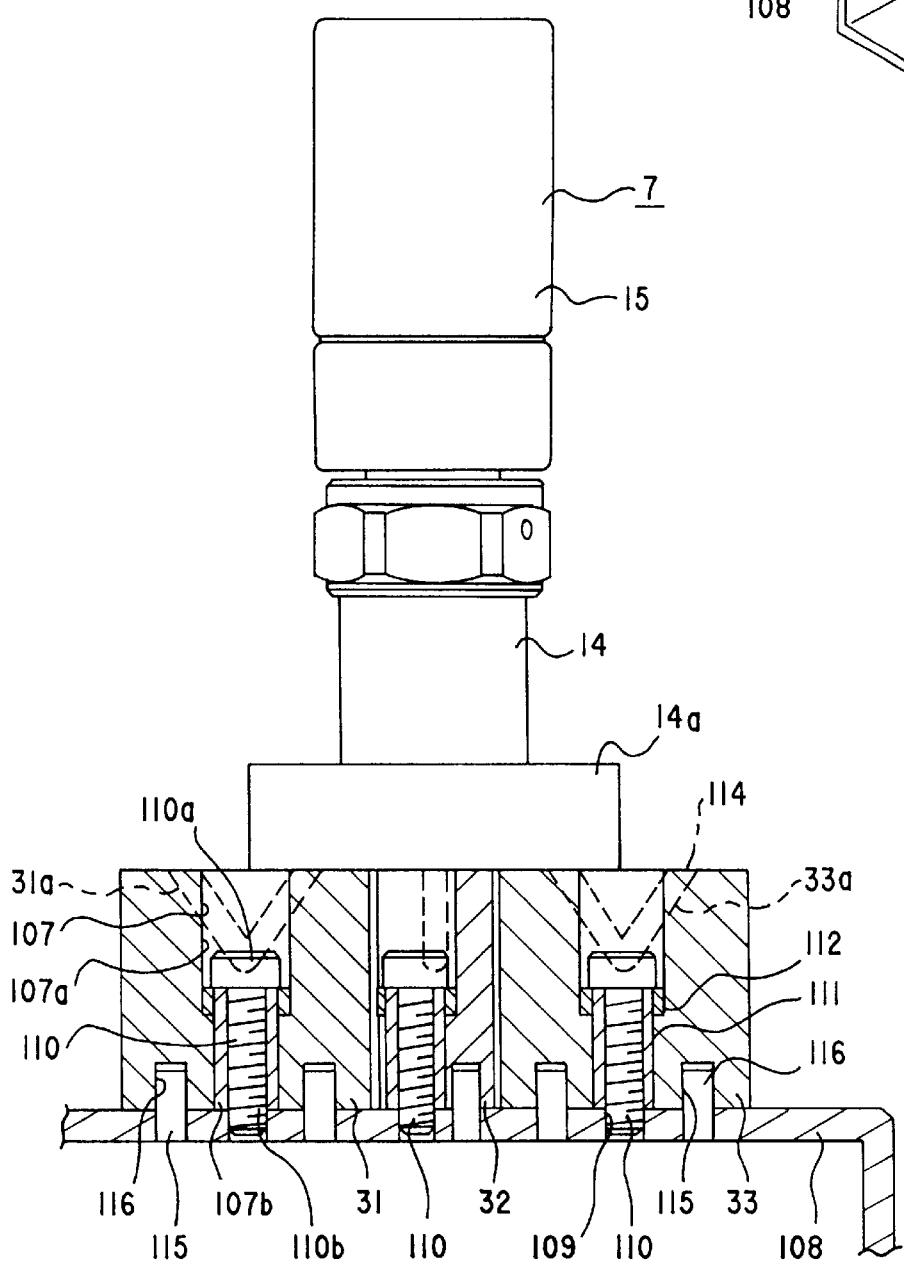
FIG. 5 is a front view showing a plurality of couplings as fixed to a base plate.

As seen in FIG. 5, the projections 116 are fitted into the respective cavities 115 in the bottoms of the couplings 31 to 33, the couplings 31 to 33 are fastened to the base plate 108 having screw holes 109 with the bolts 110, and the on-off valve 7 is thereafter installed to connect the couplings 31 to 33 together.

With reference to FIG. 5, each of the bolt holes 107 in the couplings 31 to 33 comprises a large portion 107a having a greater diameter than the head 110a of the bolt 110, and a small portion 107b extending from the portion 107a, with a stepped portion 107c positioned therebetween, and intermediate between the bolt head 110a and the bolt shank 110b in diameter. Fitted in the small portion 107b of the bolt hole 107 is a hollow cylindrical spacer 111 having an upper end positioned within the large portion 107a and a lower end bearing on the base plate 108. The spacer 111 has an inside diameter greater than the diameter of the bolt shank 110b and an outside diameter smaller than the bolt head 110a. The bolt head 110a bears on the upper end of the spacer 111 with the shank 110b fitted in the spacer 111. The spacer 111 determines the amount of tightening of the bolt 110, such that when the bolt 110 as inserted through the hole 107 is screwed into the screw hole 109 in the base plate 108, the spacer 11 acts against the head 110a and the base plate 108, preventing further tightening of the bolt 110. Fitted around the upper end of the spacer 111 is an annular rubber washer 112 having an outside diameter approximately equal to the diameter of the head 110a of the bolt 110. The washer 112 is held between the bolt head 110a and the step ped portion 107c of the bolt hole 107. The rubber washer 112 has such a vertical length that a compressive force acts on the washer 112 when the bolt 110 is completely tightened up as seen in FIG. 5. Consequently, the couplings 31 to 33 are biased toward the base plate 108 by the rubber washers 112. The rubber washers 112 are elastic and can therefore be further deformed by compression, permitting the couplings 31 to 33 to be moved away from the base plate 108. Accordingly, the bolts 110 can be readily tightened up even when the upper surfaces of the couplings 31 to 33 are not flush because the couplings 31 to 33 move toward the on-off valve 7 when the valve 7 is attached to the couplings 31 to 33 with the bolts 110. As a result, all the portions to be sealed off can be subjected to a proper pressure and thereby sealed off. Further with the positioning projections 116 on the base plate 108 fitted in the positioning cavities 115 formed in the bottoms of the couplings 31 to 33, the valve mounts 28, 29 can be position ed in place reliably relative to the base plate 108. This eliminates the misregister of the bolt holes in the valve main bodies 12, 14, 16, 18, 20 with the corresponding screw bores 106 of the valve mounts 28, 29 or the misregister of the channels of the valve bodies 12, 14, 16, 18, 20 with the corresponding channels of the mounts 28, 29 when the valve bodies 12, 14, 16, 18, 20 are installed one after another on the mounts 28, 29, facilitating the installation of the valve main bodies 12, 14, 16, 18, 20 and assuring the abutting portions of the channels of fluid-tightness with ease.

What is claimed is:

1. A shutoff-opening device, comprising:
   a plurality of valves each having an inlet and an outlet positioned separately in a lower surface thereof; and
   a valve mount having the valves removably installed thereon from above as arranged in a direction, said valve mount including an inflow channel forming member having a channel in communication with the inlet of the valve disposed at one end thereof, at least one communication channel forming member having a channel for causing the inlet of one of the valves to communicate with the outlet of the valve adjacent thereto, and an outflow channel forming member having a channel in communication with the outlet of the valve disposed at the other end of the mount.

2. A shutoff-opening device according to claim 1, wherein at least one of the valves has an inlet-outlet port positioned between the inlet and the outlet of the valve and serving as an inlet or outlet for other fluid, the valve mount further comprising at least one subchannel forming member having a channel communicating with the inlet-outlet portion.

3. A shutoff-opening device according to claim 2, wherein a main body of the valve having the inlet-outlet port is formed with an inflow channel extending from the inlet thereof to a valve chamber, a subchannel extending from the inlet-outlet port to the valve chamber, and an outflow channel extending from the outlet thereof to the valve chamber, the subchannel being closable and openable by a valve element, the inflow channel being always in communication with the outflow channel.

4. A shutoff-opening device according to claim 2 wherein the inflow channel forming member, the communication channel forming member, the outflow channel forming member and the subchannel forming member are each formed in a lower surface thereof with at least one positioning projection or positioning cavity, and the valve mount is fixed to a support member formed with a positioning cavity or a positioning projection corresponding to the positioning projection or the positioning cavity.

* * * * *